United States Patent

Brandt et al.

US 8,457,634 B2
Jun. 4, 2013

(54) METHOD AND APPARATUS FOR PROVIDING AN EFFICIENT HANDOVER IN A TELECOMMUNICATIONS SYSTEM

(75) Inventors: Achim von Brandt, München (DE); Domagoj Premec, Zagreb (DE)

(73) Assignee: Nokia Siemens Networks Oy, Espoo (FI)

( * ) Notice: Subject to any disclaimer, the term of this patent is extended or adjusted under 35 U.S.C. 154(b) by 710 days.

(21) Appl. No.: 12/418,856

(22) Filed: Apr. 6, 2009

(65) Prior Publication Data

US 2009/0298503 A1    Dec. 3, 2009

(30) Foreign Application Priority Data

Apr. 4, 2008 (EP) .................................... 08006863

(51) Int. Cl.
*H04W 36/00* (2009.01)

(52) U.S. Cl.
USPC .......................................... 455/436; 370/331

(58) Field of Classification Search
USPC ................... 455/436; 370/328, 331
See application file for complete search history.

(56) References Cited

U.S. PATENT DOCUMENTS

| 2007/0293224 | A1* | 12/2007 | Wang et al. | 455/436 |
| 2008/0049676 | A1* | 2/2008 | Xiang | 370/331 |
| 2010/0002650 | A1* | 1/2010 | Ahluwalia | 370/331 |
| 2010/0178920 | A1* | 7/2010 | Kitazoe et al. | 455/436 |
| 2010/0189071 | A1* | 7/2010 | Kitazoe | 370/331 |

OTHER PUBLICATIONS

"Part 16: Air Interface for Fixed Broadband Wireless Access Systems", IEEE Standard for Local and Metropolitan Area Networks 802.16-2004 (Oct. 1, 2004), 893 Pages.
"Mobility in LTE_ACTIVE state", Vodafone Group. Document for Discussion and Approval 4.5.1 , 3GPP TSG RAN WG2#58bis (Jun. 25-29, 2007), 6 Pages.
"Part 16: Air Interface for Fixed Broadband Wireless Access Systems—Amendment 2: Physical and Medium Access Control Layers for Combined Fixed and Mobile Operation in Licensed Bands and Corrigendum 1", IEEE Std 802.16e™-2005 and IEEE Std 802.16™-2004/Cor1-2005 (Amendment and Corrigendum to IEEE Std 802. 16-2004), Feb. 28, 2006, 863 Pages.
"WiMAX Forum Network Architecture (Stage 3: Detailed Protocols and Procedures)", WiMAX Forum, Release 1, Version 1.2 (Jan. 11, 2008), 60 Pages.
"WiMAX Forum Network Architecture (Stage 3: Detailed Protocols and Procedures)", WiMAX Forum, Release 1.1.0 (Jul. 11, 2007), 518 Pages.
"WiMAX Forum Network Architecture (Stage 3: Detailed Protocols and Procedures) [Annex: WiMAX—3GPP2 Interworking]", WiMAX Forum, Release 1.1.0 (Jul. 11, 2007), 17 Pages.

(Continued)

*Primary Examiner* — Patrick Edouard
*Assistant Examiner* — Myron K Wyche
(74) *Attorney, Agent, or Firm* — Brake Hughes Bellermann LLP (57) ABSTRACT

Apparatus and method for an efficient handover of at least one user equipment from a first access node to at least one further access node of a plurality of access nodes in a telecommunications system, said method comprising the steps of: said first access node, upon reception of a handover request from said user equipment, preparing a group of further access nodes of said plurality as possible target access nodes, upon attachment of said user equipment to said one further access node, said one further access node transmitting a message to said first access node, and upon reception of said message by said first access node, said first access node transmitting a further message to said possible target access nodes.

15 Claims, 3 Drawing Sheets

OTHER PUBLICATIONS

"WiMAX Forum Network Architecture (Stage 3: Detailed Protocols and Procedures) [Annex: WiMAX—3GPP Interworking]", WiMAX Forum, Release 1.1.0 (Jul. 11, 2007), 12 Pages.

"WiMAX Forum Network Architecture (Stage 3: Detailed Protocols and Procedures) [Annex: Prepaid Accounting]", WiMAX Forum, Release 1.1.0 (Jul. 11, 2007), 44 Pages.

"WiMAX Forum Network Architecture (Stage 3: Detailed Protocols and Procedures) [Annex: R6/R8 ASN Anchored Mobility Scenarios]", WiMAX Forum, Release 1.1.0 (Jul. 11, 2007), 15 Pages.

Extended European Search Report for Application No. 08006863.8-1249, mailed Sep. 18, 2008, 8 Pages.

* cited by examiner

METHOD AND APPARATUS FOR PROVIDING AN EFFICIENT HANDOVER IN A TELECOMMUNICATIONS SYSTEM

PRIORITY CLAIM

This Application claims priority based on European Patent Office Application No. EP008006863, filed on Apr. 4, 2008, entitled, "Method and Apparatus for providing an efficient handover in a telecommunications system," the disclosure of which is hereby incorporated by reference in its entirety.

TECHNICAL FIELD

The invention is used in telecommunications systems to ensure that handovers are executed in an efficient manner.

SUMMARY

In today's telecommunications systems, especially in cellular or mobile telecommunications systems UEs (User Equipments) can move or roam within the systems within one cell or from one cell to another and/or even change from one system to another. A UE can be at least one of the following: a mobile telephone (MT), a portable computer, a laptop, a cellular telephone, a portable internet device, a mobile station (MS).

In telecommunications systems a UE or a MS is connected to a network such as a PSTN (Public Switched Telephone Network) or the internet via a wireless connection to an access node (AN). The AN is part of a radio access network which provides the required bi-directional connectivity. An AN can preferably be one of the following: a base station (BS), a radio network controller (RNC), a base station controller (BSC), a nodeB.

When a UE moves or roams within the telecommunications system due to the limited area of coverage of an AN, it may become necessary to switch from one AN to another AN at certain points in time. The switching or changing of an AN is termed as a handover or handoff.

A handover can be requested by a UE when for example a power level or a signal to noise ratio of a received signal or message from the currently attached AN falls below a predefined threshold. A handover can also be instigated by an AN if it senses that the UE is approaching the edge of its are of coverage or cell, similarly by monitoring a power level or a signal to noise ratio of a received signal or message from the UE. In this case it notifies the UE that it needs to request a handover.

Once a handover request is generated, a UE has the possibility to attach itself to one of several possible target ANs after it disconnects from its serving AN. At the beginning of the handover procedure, the radio access network (RAN) will prepare the possible target ANs for an eventual attachment of the UE. This preparation is initiated by the serving AN after having receiving a handover request and consists of installing the UE specific context information and reserving resources for the UE at the different target ANs. Optionally, during the preparation a UE specific data path may be established between each target AN and the anchor data path function. At the beginning of the handover execution, the UE selects a target AN and indicates the selected AN to the current or serving AN in a handover indication (MOB_HO-IND) message. The serving AN uses this indication transmitted by the UE as a trigger to inform the selected target AN of the arrival of the UE by transmitting a handover confirm (HO_Confirm) message. At the same time the serving AN may initiate the release of the resources that were reserved at the ANs that were not selected by the UE, by transmitting a HO_Confirm message containing a specific indication to cancel and release any resources reserved for the UE.

It can occur, however, that the UE does not attach itself to the AN indicated in the MOB_HO-IND message but to another AN. Due to the fact that the AN in question will have released and reserved resources, the AN will have no context information about the UE that has just attached itself to it, even though prior to the release of the resources the AN was aware of the UE.

This issue is resolved by handling the handover as an uncontrolled handover between the UE and the target AN. In such a case however, a prolonged handover procedure will take place reducing the handover performance and negatively affecting the services being provided by a network operator. For example, if the services provided require real-time delivery to a UE, such a suboptimal procedure will reduce the efficiency of the system as well as increase the amount of network traffic due to retransmissions of lost data.

In addition, a UE can re-join the RAN by attaching itself to an AN that was not prepared for the arrival of an UE, that is a different AN from the target ANs indicated hereinabove. In this case the serving AN is not notified when the UE completes the re-joining process at the new AN, and therefore will not initiate the release of resources at the different target ANs, as mentioned herein above. Thus wasting valuable bandwidth and furthermore reducing the overall efficiency of the RAN.

This issue is resolved by each AN having timers. During the handover preparation phase, when a target AN reserves resources for a UE, it will also start a timer or watchdog timer that monitors the reserved resources. If the timer expires after a specified time period and the UE has not attached itself to the target AN, the target AN then releases the resources including the pre-established data path. However, as the timers are not synchronised they expire at different time instances and so there will always be a large time period wherein resources are reserved and are not released back to the network.

A need therefore exists for a technique that can provide for an efficient handover procedure without affecting the efficiency and without wasting resources of the network.

With the present invention, the above mentioned issues are resolved. The technique is achieved by the teachings contained in the independent method claim 1.

Said independent method claim 1 provides for an efficient handover of at least one user equipment from a first access node to at least one further access node of a plurality of access nodes in a telecommunications system, said method comprising the steps of: said first access node, upon reception of a handover request from said user equipment, preparing a group of further access nodes of said plurality as possible target access nodes; upon attachment of said user equipment to said one further access node, said one further access node transmitting a message to said first access node, and upon reception of said message by said first access node, said first access node transmitting a further message to said possible target access nodes.

Further advantageous embodiments can be seen in the dependent claims.

By transmitting said message by the one further access node to which the user equipment has attached itself to, the invention has the following advantages:

In the case that the user equipment attaches itself to an access node that was aware of a possible handover, the handover will be performed as a controlled or predictive handover and the serving access node upon reception of the message will transmit a further message commanding the release of the reserved resources.

In the case that the user equipment attaches itself to an access node that was not aware of a possible handover, the serving access node upon reception of the message will be able to also begin the initiation process for the release of the reserved resources in a timely manner.

In this way, resources are not reserved when not necessary any longer and can be released back to the network in a timely and optimised manner, thus increasing the efficiency of the overall system.

SHORT DESCRIPTION OF THE DRAWINGS

The present disclosure will become more fully understood from the description given herein below and the accompanying drawings which are given by way of illustration only and thus are not limitative of the present invention, and wherein.

DETAILED DESCRIPTION

Figure 1:
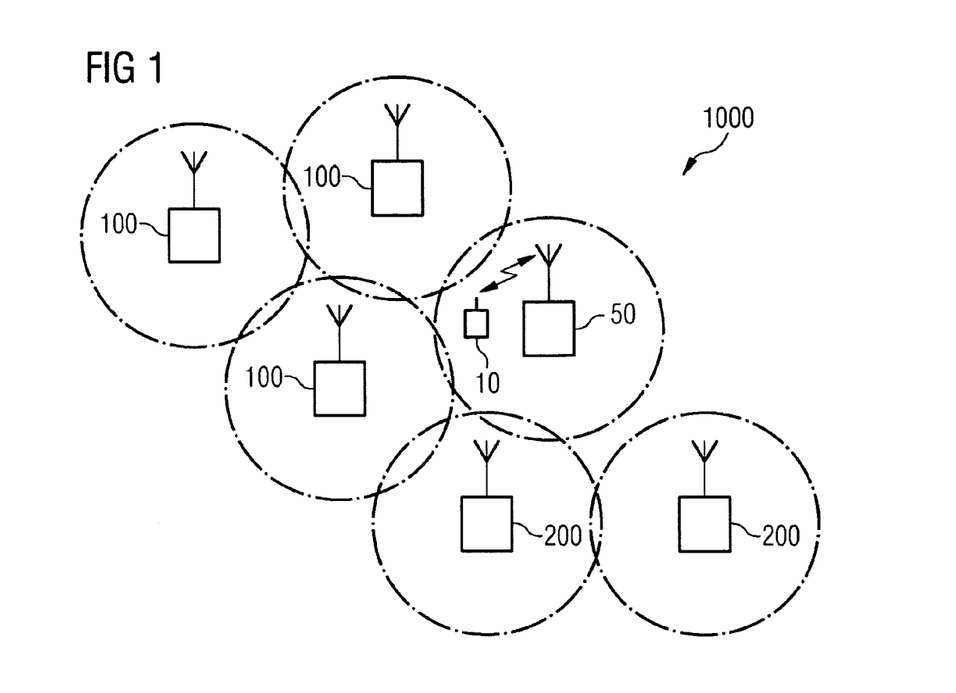
FIG. 1 shows a telecommunications system in which the invention is implemented.

FIG. 1 depicts a telecommunications system 1000 wherein the invention is implemented. Telecommunications system 1000 permits a user equipment (UE) or a mobile station (MS) 10 to connect to a core network such as a PSTN (Public Switched Telephone Network) or the internet via a wireless connection to an access node (AN) 50, 100, 200. The AN is part of a radio access network (RAN) which provides the required bi-directional connectivity to and from the core network and covers an area defined as a "cell", in which a UE 10 can transmit and receive messages. For reasons of clarity these connections are not depicted, however a person skilled in the art would be aware of them. An AN 50, 100, 200 can preferably be one of the following: a base station (BS), a radio network controller (RNC), a base station controller (BSC), a nodeB. A UE 10 located within the cell of AN 50 communicates with AN 50 via a wireless connection. At some point in time, when UE 10 reaches the boundary of the cell, the power level of received signals from AN 50, which UE 10 monitors, will fall below a predefined threshold. When this occurs, UE 10 will request a handover from AN 50 to another AN.

Once a handover request is generated, the serving AN 50 prepares a group of further ANs 100 as possible target ANs to which UE 10 can attach itself. This preparation is initiated by the serving AN 50 after having receiving a handover request and consists of installing the UE 10 specific context information, path information and reserving resources for UE 10 at the different target ANs 100. Optionally, during the preparation a UE 10 specific data path may be established between each target AN 100 and the anchor data path function to AN 50.

According to the invention, once UE 10 has attached itself to an AN 100, 200 the new AN 100, 200 transmits a message to the first AN 50 indicating that the handover is complete (HO_Complete message). Upon reception of this message by the first AN 50, the first AN 50 in turn transmits a further message to the possible target ANs 100. This further message (HO_Confirm message) instructs the possible target ANs 100 to release any reserved resources reserved for UE 10.

In one embodiment of the invention, UE 10 attaches itself to an AN 100 that is part of the group of potential target ANs 100. In another embodiment of the invention, UE 10 attaches itself to an AN 200 that belongs to a further group of access nodes of the plurality of ANs of system 1000, this further group being different from the group of possible target ANs 100.

In both embodiments the transmitted message indicating that the handover is complete (HO_Complete message), is mandatory. Until reception of this message the HO_Confirm message is not transmitted as the handover is not yet complete and the reserved resources need to be remain reserved.

Figure 2:
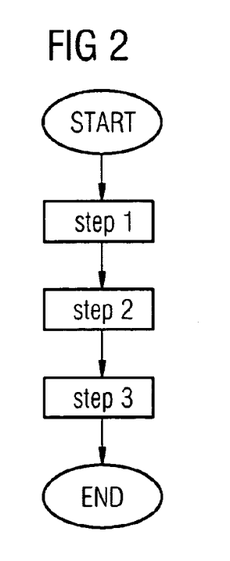
FIG. 2 depicts a flow chart showing the steps of the inventive method.

FIG. 2 depicts a flow chart showing the steps of the inventive method.

In step 1, upon reception of a handover request from a UE 10 which is attached to it, a first (or serving) AN 50, prepares a group of further ANs 100 of a plurality of ANs of a telecommunications system 1000, as possible target ANs. In step 2, upon attachment of the UE 10 to one further AN 100, 200, the one further AN 100, 200 transmits a message to the first AN 50, and in step 3 upon reception of this message the first AN 50 in turn transmits a further message to the possible target ANs.

The message sent to the first AN 50 indicates that the handover is complete (HO_Complete message). The further message transmitted to the possible target ANs 100 is a HO_Confirm message, which instructs the possible target ANs 100 to release any reserved resources reserved for UE 10.

Figure 3:
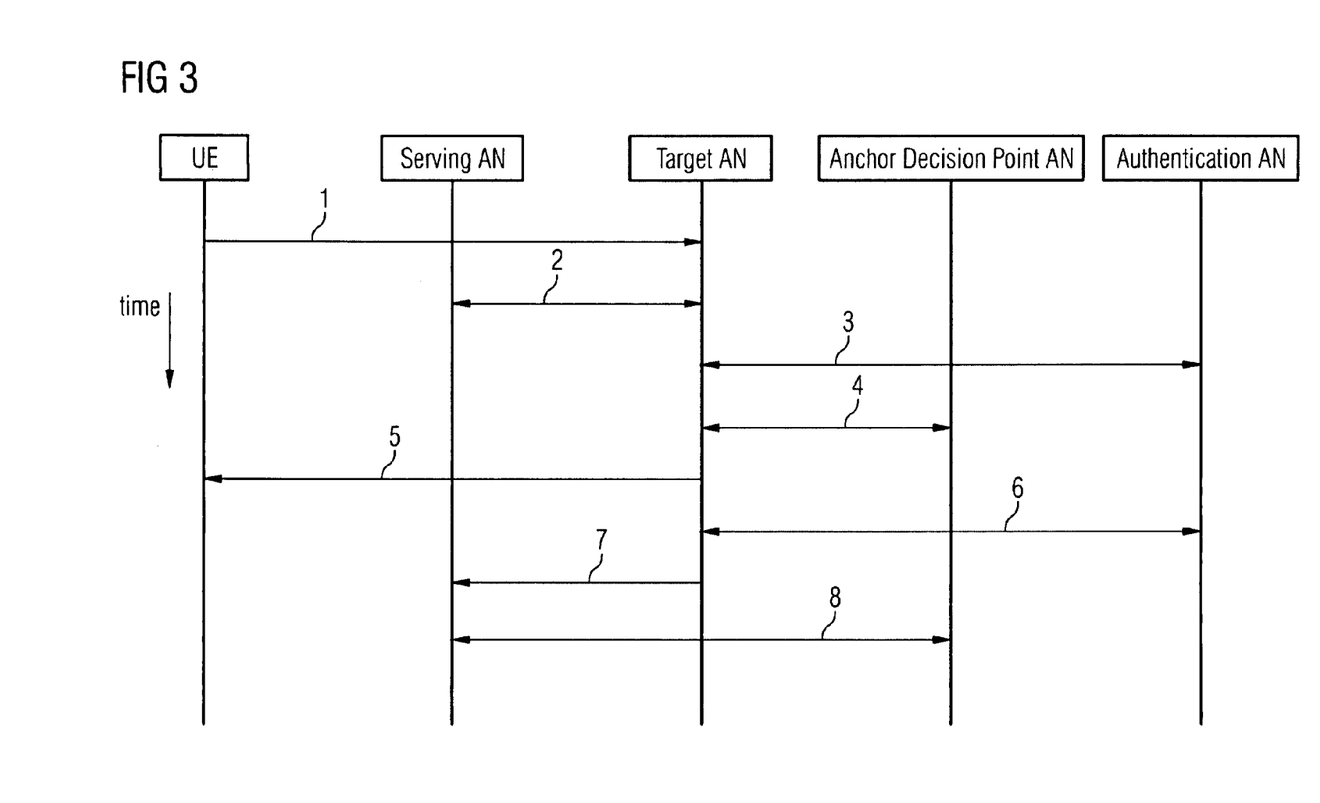
FIG. 3 is a time diagram depicting a typical handover according to the WiMAX specification, wherein the invention is applicable.

FIG. 3 is a time diagram depicting a typical handover according to the WiMAX specification, wherein the invention is applicable.

In step 1, a UE transmits a ranging request (RNG-REQ) message to a target AN. In step 2, the target AN sets up a two-way path to carry data over a R4 interface with the serving AN of the UE (R4-Context Retrieval Procedure of UE). In step 3, the target AN will further set up a two-way path to carry data over a R4 interface with an authenticator AN, in order to retrieve authentication data (Authentication (AK) Context). In step 4, the target AN will further set up a two-way path to carry data over a R4 interface with an anchor AN, in order to register the data path (R4-Data Path Registration). In step 5, the target AN transmits a ranging response (RNG-RSP) to the UE in reply to the ranging request transmitted in 1. In step 6, the target AN will further set up a two-way path to carry data over a R4 interface with an authenticator AN, in order to execute a Cipher based Message Authentication code (CMAC) key count update procedure. In step 7, once the handover procedure is complete, the target AN transmits a message to the serving AN, indicating that the UE has now attached itself to the target AN. The message transmitted is a Handover Complete (HO_Complete) message. In step 8, the serving AN will set up a two-way path to carry data over a R4 interface with the anchor AN in order to de-register the data path.

The invention can be implemented in an AN 50, 100, 200 having means arranged to execute the steps of the method of the independent claim. AN 50, 100, 200 is at least one of the following: a base station, an access node, a nodeB, a radio network controller, a base station controller.

Figure 4:
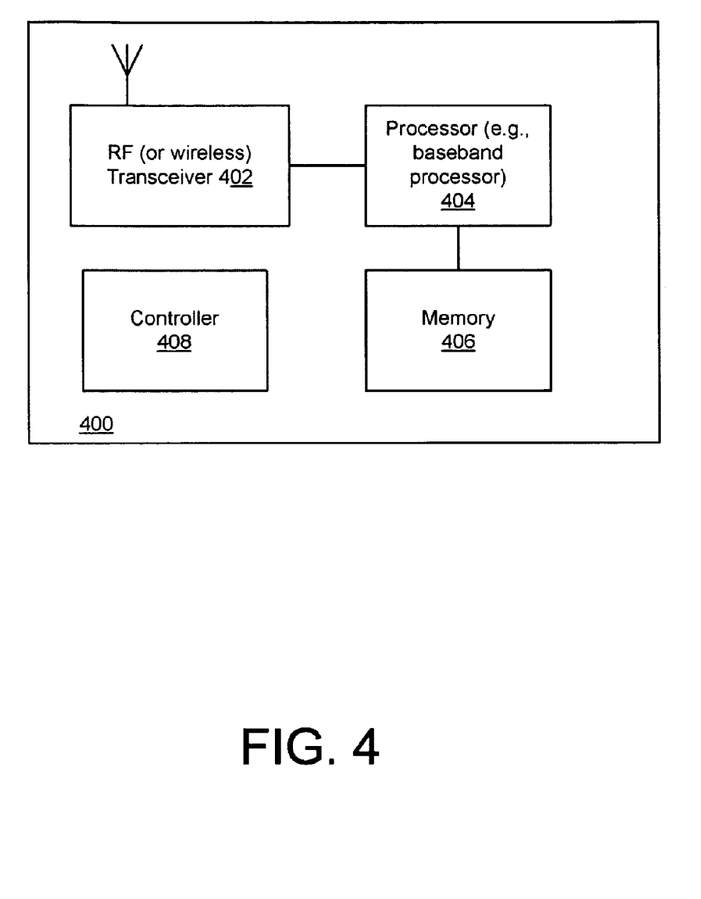
FIG. 4 is a block diagram of an apparatus according to an example embodiment.

FIG. 4 is a block diagram of an apparatus 400 according to an example embodiment. The apparatus 400 (e.g., base station, access node, nodeB, radio network controller, or base station controller) may include, for example, an RF (radio frequency) or wireless transceiver 402, including a transmitter to transmit signals and a receiver to receive signals, a processor 404 to execute instructions or software and control transmission and receptions of signals, and a memory 406 to store data and/or instructions.

Processor 404 may also make decisions or determinations, generate frames or messages for transmission, decode received frames or messages for further processing, and other tasks or functions described herein. Processor 404, which may be a baseband processor, for example, may generate messages, packets, frames or other signals (such as those described above) for transmission via wireless transceiver 402. Processor 404 may control transmission of signals or messages over a wireless network, and may receive signals or messages, etc., via a wireless network (e.g., after being down-converted by wireless transceiver 402, for example). Processor 404 may be programmable and capable of executing software or other instructions stored in memory or on other computer media to perform the various tasks and functions described above, such as one or more of the tasks or methods described above. Processor 404 may be (or may include), for example, hardware, programmable logic, a programmable processor that executes software or firmware, and/or any combination of these. Using other terminology, processor 404 and transceiver 402 together may be considered as a wireless transmitter/receiver system, for example.

In addition, referring to FIG. 4, a controller (or processor) 408 may execute software and instructions, and may provide overall control for the station 400, and may provide control for other systems not shown in FIG. 4, such as controlling input/output devices (e.g., display, keypad), and/or may execute software for one or more applications that may be provided on wireless station 400, such as, for example, an email program, audio/video applications, a word processor, a Voice over IP application, or other application or software. In addition, a storage medium such as the memory 406 may be provided that includes stored instructions, which when executed by a controller or processor may result in the processor 404, or another controller or processor, performing one or more of the functions or tasks described above.

Although the invention has been described in terms of preferred embodiments and refinements described herein, those skilled in the art will appreciate other embodiments and modifications which can be made without departing from the scope of the teachings of the invention. All such modifications are intended to be included within the scope of the claims appended hereto.

The invention claimed is:

1. Method for an efficient handover of at least one user equipment from a first access node to a second access node of a plurality of access nodes in a telecommunications system, the plurality of access nodes including at least the second access node and a third access node, said method comprising:
said first access node, upon reception of a handover request from said user equipment, preparing the plurality of access nodes as possible target access nodes, the plurality of access nodes including at least the second access node and the third access node;
upon attachment of said user equipment to said second access node, receiving from said second access node a Handover Complete message; and
upon reception of said Handover Complete message, transmitting a release message to said third access node commanding the release of reserved resources from said third access node.

2. Method according to claim 1, wherein said release message instructs said third access node to release reserved resources, said reserved resources having been reserved for said user equipment.

3. A first access node configured for an efficient handover of at least one user equipment from the first access node to a second access node of a plurality of access nodes in a telecommunications system, said first access node comprising:
a processor; and
a memory including instructions stored thereon that, when executed by the processor, are configured to cause the first access node to:
upon reception of a handover request from said user equipment, prepare a plurality of access nodes as possible target access nodes, the plurality of access nodes including at least the second access node and a third access node;
upon attachment of said user equipment to said second access node, receive a Handover Complete message from said second access node; and
upon reception of said Handover Complete message by said first access node, transmit a release message to said third access node commanding the release of reserved resources from said second access node.

4. The apparatus according to claim 3, wherein said release message instructs said possible target access nodes to release reserved resources, said reserved resources having been reserved for said user equipment.

5. A method for an efficient handover of at least one user equipment from a first access node to a second access node of a plurality of access nodes in a telecommunications system, said method comprising:
preparing, by said first access node upon reception of a handover request from said user equipment, the plurality of access nodes of said plurality as possible target access nodes, the plurality of access nodes including at least the second access node and a third access node;
receiving a Handover Complete message at said first access node from said second access node, said second access node having transmitted said Handover Complete message upon attachment of said user equipment to said first access node; and
transmitting, by said first access node upon reception of said Handover Complete message, a release message to said third access node commanding the release of reserved resources from said third access node.

6. The method of claim 1, further comprising said second access node transmitting the Handover Complete message to said first access node.

7. The method of claim 1, wherein said preparing the plurality of access nodes includes installing user equipment specific context information at the plurality of access nodes.

8. The method of claim 1, wherein said preparing the plurality of access nodes includes installing path information at the plurality of access nodes.

9. The method of claim 1, wherein said preparing the plurality of access nodes includes reserving resources for the user equipment at the plurality of access nodes.

10. The method of claim 1, wherein said preparing the plurality of access nodes includes installing user equipment specific context information, installing path information, and reserving resources for the user equipment at the plurality of access nodes.

11. The apparatus of claim 3, wherein said preparing the plurality of access nodes includes installing user equipment specific context information at the plurality of access nodes.

12. The apparatus of claim 3, wherein said preparing the plurality of access nodes includes installing path information at the plurality of access nodes.

13. The apparatus of claim 3, wherein said preparing the plurality of access nodes includes reserving resources for the user equipment at the plurality of access nodes.

14. The apparatus of claim 3, wherein said preparing the plurality of access nodes includes installing user equipment specific context information, installing path information, and reserving resources for the user equipment at the plurality of access nodes.

15. A non-transitory computer-readable storage medium comprising instructions stored thereon that, when executed by at least one processor, are configured to cause a first access node to at least:
   upon reception of a handover request from a user equipment, prepare plurality of access nodes as possible target access nodes, the plurality of access nodes including at least a second access node and a third access node;
   upon attachment of said user equipment to said second access node, receive a Handover Complete message from said second access node; and
   upon reception of said Handover Complete message by said first access node, transmit a release message to said third access node commanding the release of reserved resources from said second access node.

* * * * *

UNITED STATES PATENT AND TRADEMARK OFFICE
CERTIFICATE OF CORRECTION

PATENT NO. : 8,457,634 B2
APPLICATION NO. : 12/418856
DATED : June 4, 2013
INVENTOR(S) : Achim von Brandt et al.

It is certified that error appears in the above-identified patent and that said Letters Patent is hereby corrected as shown below:

On the Title Page, Item (75), under "Inventors", in column 1, line 2, delete "(DE)" and insert -- (HR) --, therefor.

Signed and Sealed this
Twentieth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,457,634 B2
APPLICATION NO. : 12/418856
DATED : June 4, 2013
INVENTOR(S) : Brandt et al.

Page 1 of 1

It is certified that error appears in the above-identified patent and that said Letters Patent is hereby corrected as shown below:

In the Claims

In Column 6, Line 25, Claim 3, delete "second" and insert -- third --, therefor.

In Column 7, Line 26, Claim 15, delete "second" and insert -- third --, therefor.

Signed and Sealed this
Twentieth Day of August, 2019

Andrei Iancu
*Director of the United States Patent and Trademark Office*